United States Patent [19]

Pinvidic

[11] Patent Number: 5,425,510
[45] Date of Patent: Jun. 20, 1995

[54] REEL FOR FLY FISHING

[76] Inventor: Jacques Pinvidic, La Riante, 1135 Chemin de la Souque, Quartier Patheron 13090 Aix en Provence, France

[21] Appl. No.: 223,690

[22] Filed: Apr. 6, 1994

[30] Foreign Application Priority Data

Apr. 8, 1993 [FR] France ............... 93 04178

[51] Int. Cl.⁶ ............................................. A01K 89/016
[52] U.S. Cl. ...................................... 242/256; 242/249; 242/318
[58] Field of Search .............. 242/249, 256, 303, 317, 242/318

[56] References Cited

U.S. PATENT DOCUMENTS

| | | | |
|---|---|---|---|
| 1,709,952 | 4/1929 | Ricketts | 242/256 |
| 2,564,975 | 8/1951 | Holm | 242/318 |
| 2,591,338 | 4/1952 | Cooper | |
| 3,446,453 | 5/1969 | Pachner | |
| 3,510,083 | 5/1970 | Cook | 242/318 |
| 3,675,870 | 7/1972 | Ride et al. | 242/249 |
| 4,850,548 | 7/1989 | Faulkner | 242/256 |
| 5,303,877 | 4/1994 | Ciocca | 242/256 |

FOREIGN PATENT DOCUMENTS 2497064 7/1982 France .
2521398 8/1983 France .

*Primary Examiner*—Daniel P. Stodola
*Assistant Examiner*—Eileen A. Dunn
*Attorney, Agent, or Firm*—Browdy and Neimark

[57] ABSTRACT

A "horizontal" type reel for fly fishing comprising a line-receiving spool mounted to rotate inside a housing and rotated by a step-up gear mechanism controlled by a lever pivotally mounted on the end wall of the housing about an axis that is perpendicular to the axis of rotation of the spool, said lever extending along the handle of a fishing rod.

9 Claims, 3 Drawing Sheets

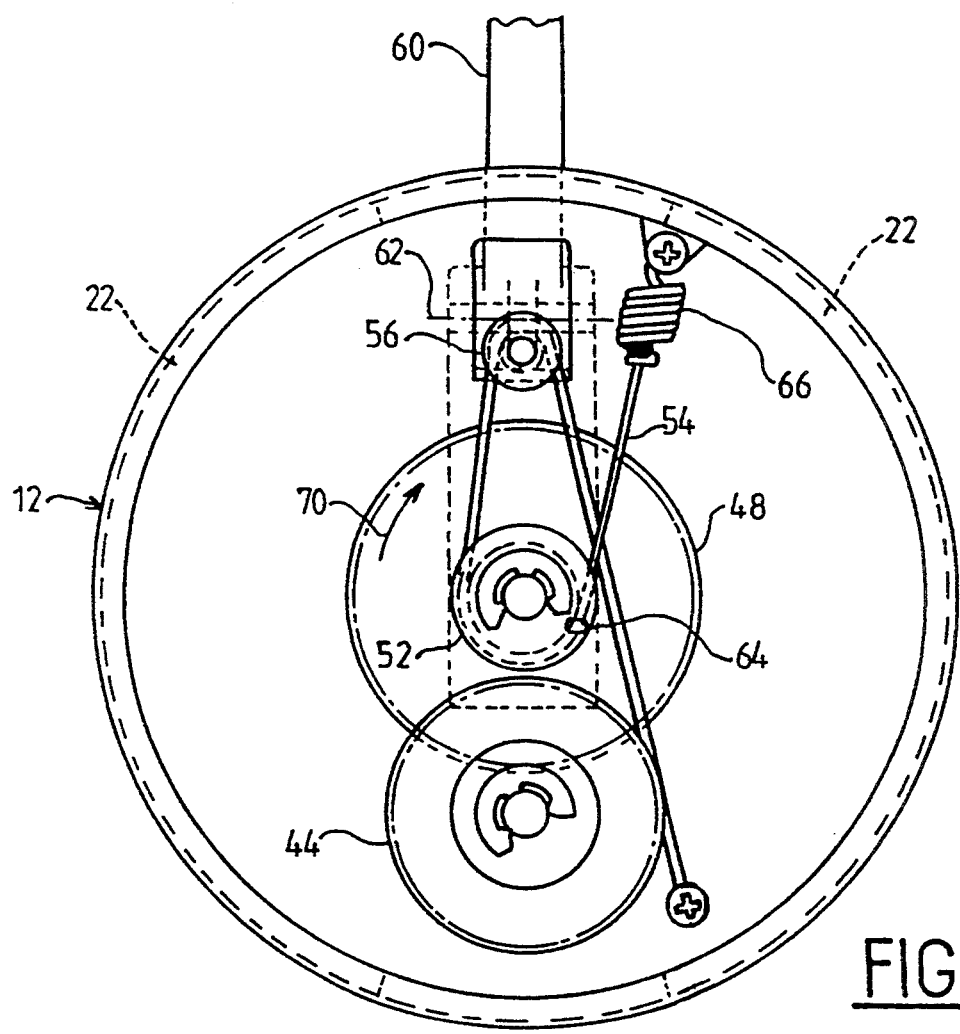
FIG. 2
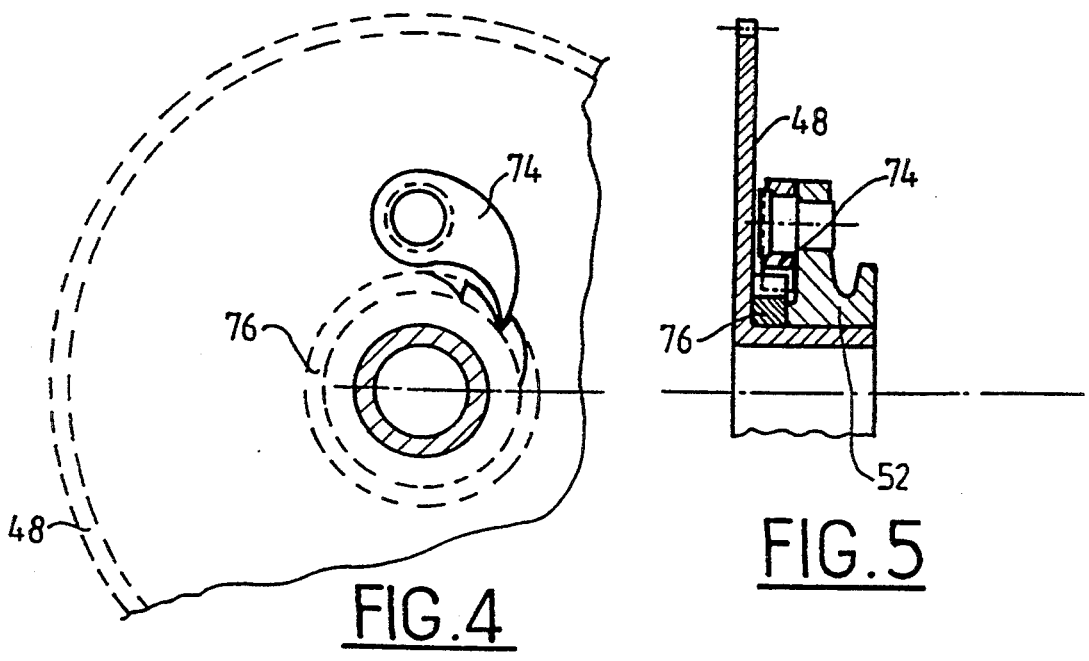
FIG. 4
FIG. 5

REEL FOR FLY FISHING

FIELD OF THE INVENTION

The invention relates to a reel for fly fishing, the reel comprising a line-receiving spool that is mounted to rotate about an axis in a housing, and drive means for rotating the spool in one direction, the drive means including a freewheel mechanism or the like allowing the spool to rotate freely in one direction, rotation of the spool in the other direction being controlled by the above-mentioned drive means.

BACKGROUND OF THE INVENTION

Fly fishing requires relatively long lengths of line to be reeled in and out, and the reels used must make it possible to reel the line out easily by pulling the line off the reel, and must enable the line to be reeled in quickly by acting on a lever or other means for rotating the spool in the appropriate direction.

Known reels for fly fishing are either of the automatic type including an electric motor or a spring for reeling in the line, in which case they are expensive, heavy, and relatively fragile, or else they are of the type that is manually driven by means of a lever of the crank handle type in which case they are relatively noisy and do not enable the line to be reeled in quickly.

In addition, manually controlled reels are often of the "vertical" type, i.e. the reel is fixed on the fishing rod in such a manner that the plane of rotation of the spool contains the axis of the fishing rod, with the axis of rotation of the spool being horizontal and perpendicular to the fishing rod. That type of reel suffers from the drawback that traction exerted on the line to reel it out tends to cause the fishing rod to rotate in the hand of the fisher and causes the line to change direction quite considerably (which line is fragile), thereby often causing the fisher to bend the wrist to accompany traction motion of the line.

There also exist "horizontal" type reels in which the axis of rotation of the spool is substantially perpendicular relative to the axis of the rod and intersects said axis, the plane of rotation of the spool being parallel to the axis of the fishing rod and extending substantially horizontally when the fishing rod is held horizontally.

That type of reel can be used equally well by a person who is left handed and by a person who is right handed, and the line can be reeled out more easily. However, in known reels of that type, the actuator levers of the means for rotating the spool to reel in the line are unhandy in use, and the line is reeled in relatively slowly. They are also quite noisy.

OBJECTS AND SUMMARY OF THE INVENTION

An object of the present invention is to provide a reel for fly fishing, the reel being of the "horizontal" type and manually driven, while avoiding the above-mentioned drawbacks.

Another object of the invention is to provide a reel of this type that is cheap, quiet, and particularly reliable.

Another object of the invention is a reel of this type which is particularly simple and quick to install, remove, and adjust.

To this end, the invention provides a reel for fly fishing, the reel comprising a line-receiving spool mounted to rotate about an axis in a housing, lever means for driving the spool to rotate in one direction, and fastening means for fastening the housing to a fishing rod in a position such that the plane of rotation of the spool is "horizontal" and substantially parallel to the rod, wherein the actuator lever is pivotally mounted on the housing about an axis that is perpendicular to the axis of rotation of the spool.

Preferably, the lever extends substantially along the rod.

The reel can thus be used exactly like a "vertical" type reel, with a length of line being reeled in by a natural movement of a finger engaging the lever which is caused to pivot by being moved towards the rod. In addition, the reel is usable in the same manner regardless of whether a person is left handed or right handed.

According to another characteristic of the invention, the lever includes an end that extends inside the housing substantially parallel to the axis of rotation of the spool.

Said end of the lever carries a pulley over which there passes a cable for driving a step-up gear mechanism engaging with a toothed wheel for driving the spool, the ends of the cable being fixed to the housing.

In one embodiment, the cable passes over a pulley forming a portion of the above-mentioned drive means and is fixed to a point of the periphery of said pulley.

In another embodiment, the above-mentioned lever cooperates with an arm having a toothed sector and pivotally mounted inside the housing about an axis that is parallel to the axis of rotation of the spool, and associated with a return spring, the above-mentioned toothed sector being engaged with a gear wheel of a step-up gear mechanism for imparting rotary drive to the spool.

The invention thus makes it simple to fit drive mechanisms that have been designed for "vertical" type reels, which mechanisms can be used with practically no modification in a "horizontal" reel of the invention.

According to another characteristic of the invention, the spool is carried by a sleeve installed on a cylindrical shaft fixed to the end wall of the housing and is held axially on said shaft by resilient snap-fastening, pusher means being provided for releasing the sleeve.

This makes it very convenient to install the spool in the housing of the reel, and to remove it therefrom.

According to yet another characteristic of the invention, the spool carries a brake washer bearing resiliently with gentle friction against a corresponding washer carried by an element of the rotary drive means, and screw means for adjusting the braking force on the spool.

It is thus very easy to adjust the traction force that needs to be applied to the line in order to reel it out. In addition, the line is reeled out silently and gives rise solely to gentle friction between two washers that bear resiliently one against the other.

In general, the reel of the invention has the advantage of being simple, cheap, and particularly convenient to use.

BRIEF DESCRIPTION OF THE DRAWINGS

The invention will be better understood and other characteristics, details and advantages thereof will appear more clearly on reading the following description given with reference to the accompanying drawings, in which:

FIG. 2 is a face view of said reel with the spool removed;

FIGS. 4 and 5 are a fragmentary face view and section view of a freewheel mechanism;

MORE DETAILED DESCRIPTION

Figure 1:
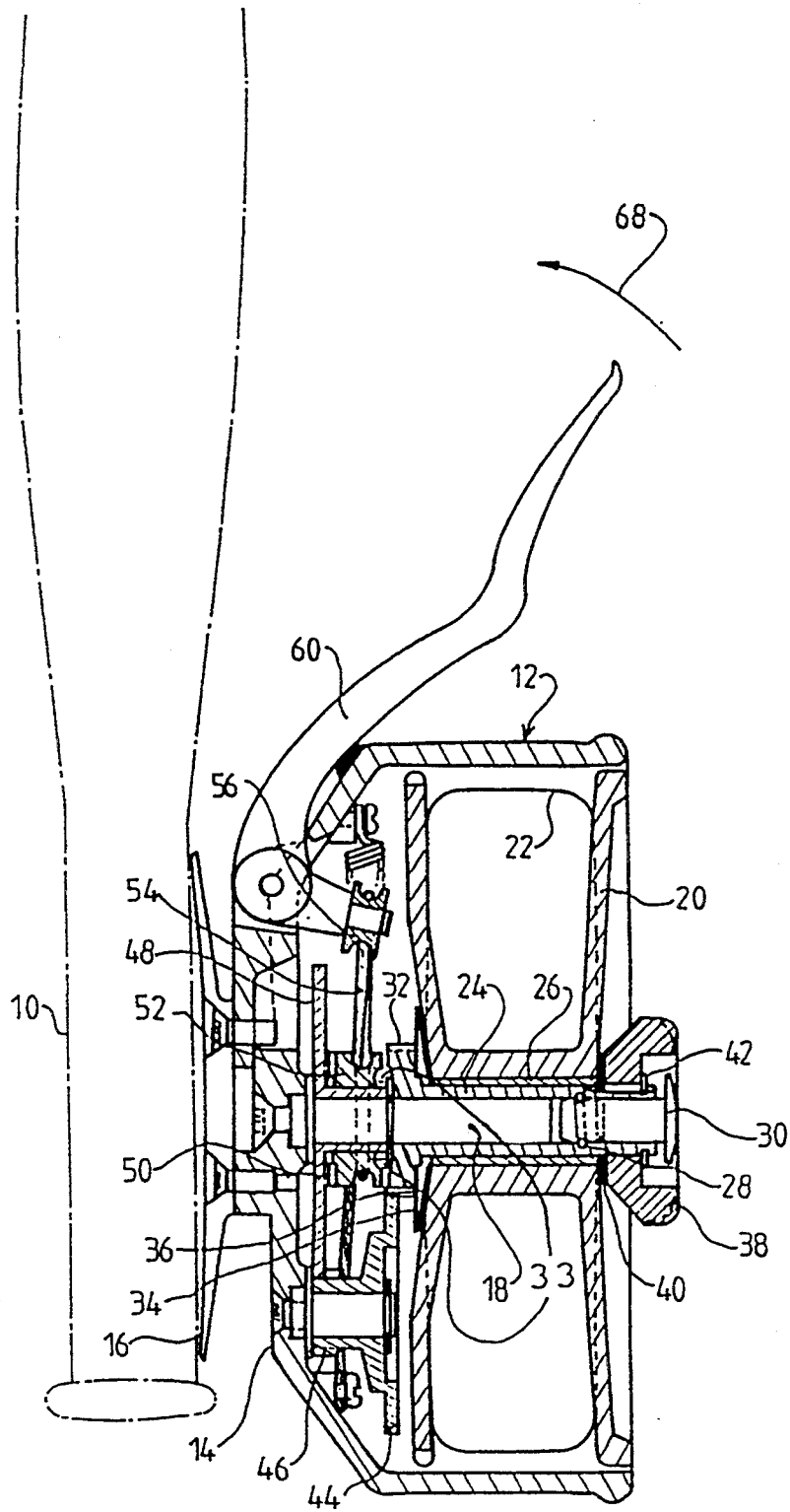
FIG. 1 is a diagrammatic axial section view through a reel of the invention.

Reference is made initially to FIGS. 1 and 2 while describing a first embodiment of a reel of the invention for fly fishing.

In FIG. 1, the reel is shown in axial section in position mounted on a fishing rod whose handle 10 is shown in chain-dotted lines.

The reel comprises a housing 12 that is generally cylindrical in shape comprising an end wall 14 having screwed thereto a foot 16 for assembly to the handle 10 of the fishing rod.

The end wall 14 of the housing also carries an axial cylindrical shaft 18 on which a line-receiving spool 20 is disposed, the peripheral wall of the housing 12 including two large openings or windows 22 enabling the line to escape to left or to right depending on whether the reel is used by a person who is right handed or left handed.

The spool 20 is mounted on a sleeve 24 via a bronze ring 26 or the like, the sleeve 24 being threaded onto the shaft 18 and being held axially in position thereon by resilient snap-fastening of a clip 28 partially engaged in an annular groove of the shaft 18 and partially engaged in an inside annular groove of the sleeve 24. The end of the shaft 18 is split longitudinally to receive a pusher 30 that projects outside the reel. The end of the pusher 30 inserted in the slot in the shaft 18 has two lateral V-shaped cutouts in which the clip 28 is normally engaged. By displacing the pusher 30 towards the inside of the reel, the diameter of the clip 28 is increased so that it escapes from the annular groove in the shaft 18, thereby enabling the assembly comprising the sleeve 24 and the spool 20 to be extracted from the reel.

The inner end of the sleeve 24 carries a toothed wheel 32 forming a part of the step-up gear mechanism of means for rotating the spool, and a washer 34 against which a corresponding washer 36 carried by the spool 20 is pressed. The two washers 34 and 36 are made of materials that are selected to obtain braking by gentle friction when the spool 20 rotates relative to the sleeve 24. The resilient force urging the washers 34 and 36 against each other is adjustable by means of a nut 38 screwed onto the threaded outer end of the sleeve 24 and bearing against the spool 20 so as to urge it towards the washer 34. A washer 40 of material that provides gentle friction is mounted on the sleeve 34 between the nut 38 and the spool 20 and is constrained to rotate with the sleeve 24 so that rotation of the spool 20 on the sleeve does not cause the nut 38 to rotate. The nut is also secured on the end of the sleeve 24 in such a manner as to prevent it from being lost, e.g. by means of a spring clip or a split ring 42.

The toothed wheel 32 carried by the inner end of the sleeve 24 engages with a toothed wheel 44 mounted to rotate on the end wall of the housing 12 in a position that is eccentric relative to the shaft 18, said toothed wheel 44 being constrained to rotate with a coaxial gear wheel 46 that in turn meshes with a toothed wheel 48 mounted to rotate on the above-mentioned shaft 18.

On one face of the toothed wheel 48 there is a ring of sloping teeth 50 meshing with similar teeth on a ring formed in one of the faces of a pulley 52 that is mounted to rotate about the axis of the shaft 18 and that is subjected to a resilient thrust produced by axial spring 33 shown in FIG. 1 urging it axially against the toothed wheel 48, the two above-mentioned toothed rings forming a non-return mechanism for transmitting rotary drive in one direction only.

A cable 54 having its ends fixed inside the housing 12 passes along an annular groove in the pulley 52 and along an annular groove in a pulley 56 carried by the end of a crank lever 60 mounted to pivot on the end wall of the housing 12 about an axis 62 perpendicular to the axis of rotation of the spool 20 and to the axial direction of the handle 10 of the fishing rod.

The cable 54 is fixed at 64 in the groove of the pulley 52 so as to prevent it from sliding therein, and one of its ends is fixed to the inside of the housing via a tension spring 66.

As can be seen clearly in FIG. 1, the lever 60 extends upwards and along the handle 10 of the fishing rod.

Thus, when a person holds the handle 10 of the rod in the left hand or in the right hand, a finger can be applied against the top portion of the lever 60 to cause it to pivot about the axis 62 in the direction indicated by arrow 68. This pivoting of the lever causes the pulley 52 to rotate in the direction shown by arrow 70 in FIG. 2. This rotation is transmitted by the claw mechanism to the toothed wheel 48 whose rotation about the shaft 18 is transmitted with a step-up effect to the toothed wheel 32 of the sleeve 24 via the gear wheel 46 of the toothed wheel 44. The spool 20 is thus rotated in the direction that corresponds to reeling in the line. Under the effect of inertia, the spool 20 continues to rotate after the lever 60 has reached the end of its stroke.

The step-up effect of the drive means shown in FIGS. 1 and 2 and the inertia of the reel are such that rotation of the pulley 52 through about half a turn enables several meters of line to be reeled onto the spool 20.

Figure 3:
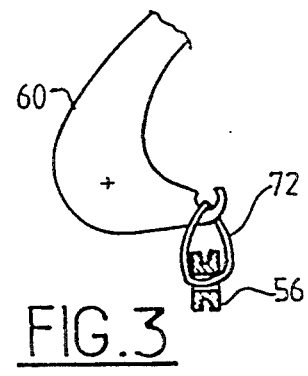
FIG. 3 is a fragmentary view of a variant embodiment.

As shown diagrammatically in FIG. 3, the pulley 56 associated with the lever 60 may be fastened thereto by means of a ring 72 instead of being mounted to rotate on the end of the lever.

In FIGS. 4 and 5, there can be seen a variant embodiment of the freewheel mechanism, said mechanism no longer being constituted by a claw system, but by a pawl system. Under such circumstances, the pawl 74 is carried by the pulley 52 and engages in asymmetrical teeth of a wheel 76 secured to the toothed wheel 48.

Figure 6:
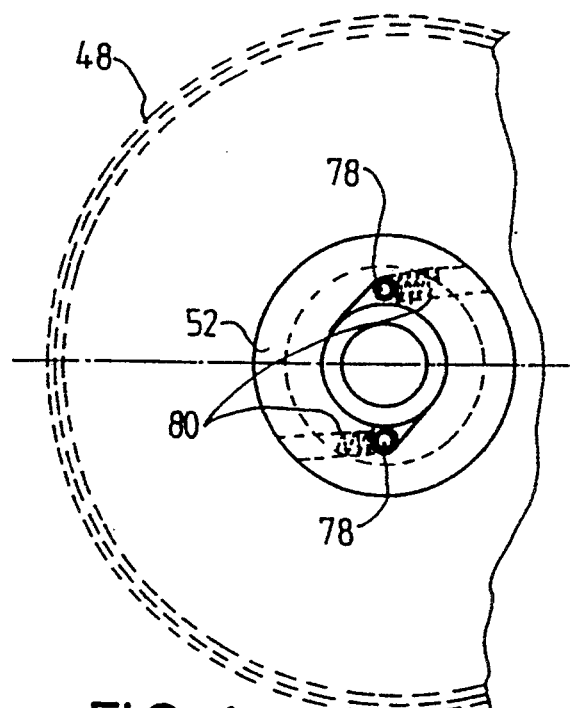
FIGS. 6 and 7 are a fragmentary face view and section view of another freewheel mechanism.
Figure 7:
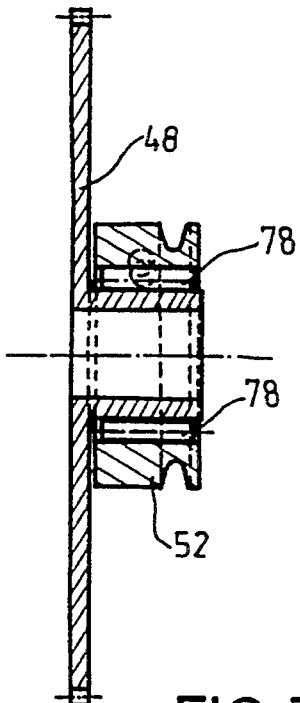

In the variant embodiment of FIGS. 6 and 7, the freewheel mechanism is constituted by a bearing having balls or rollers 78 that are biased by springs 80. This embodiment offers the advantage of operating in complete silence.

Figure 8:
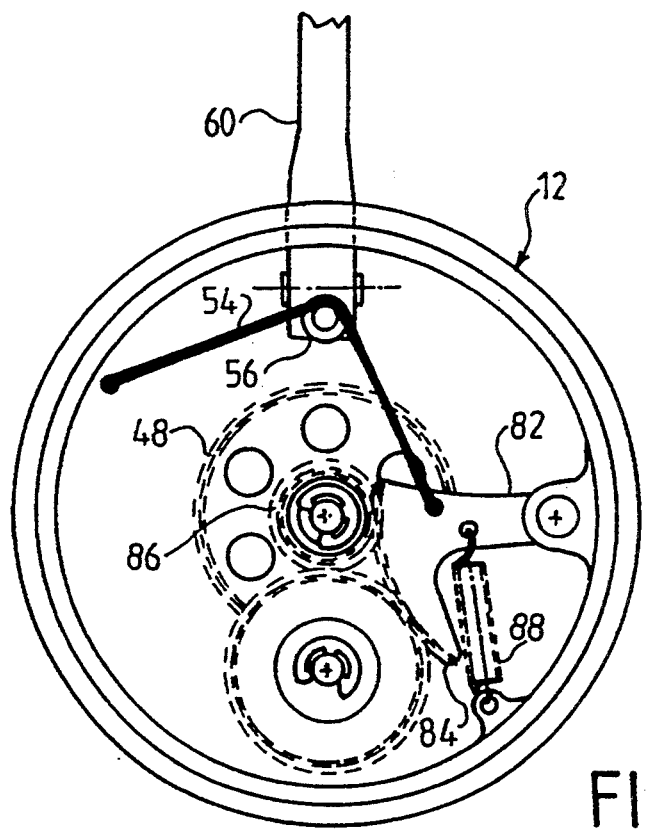
FIG. 8 is a diagrammatic face view of another embodiment of the invention.

In the variant embodiment shown in FIG. 8, the cable 54 which passes over the pulley 56 carried by the lever 60 is fixed at one end to the housing 12 and at its other end to an arm 82 that is pivotally mounted on the housing about an axis that is parallel to the axis of rotation of the spool, and that includes a toothed sector 84 engaging with a gear wheel 86 that replaces the pulley 52 of the embodiments described above. A return spring 88 is mounted between the housing 12 and the arm 82.

In this case, pivoting the lever 60 gives rise to rotation of the arm 82 about its axis against the action exerted by the return spring 88, and thus ensures meshing with the gear wheel 86 which rotates the toothed wheel 48 via a one-way drive mechanism comprising a freewheel or the like, of the same type as those described above.

In a variant (not shown), the lever 60 could be mechanically linked to the arm 82, in which case the cable 54 would be omitted.

In another variant (not shown), the lever 60 could be replaced by a traction cable wound on the pulley 52, said traction cable optionally being constituted by the above-mentioned cable 54.

I claim:

1. A reel for fly fishing, the reel comprising a line-receiving spool mounted to rotate about an axis in a housing, an actuator lever for driving the spool to rotate in one direction, and fastening means for fastening the housing to a fishing rod in a position such that the plane of rotation of the spool is substantially parallel to the rod and the axis of rotation of the spool is substantially perpendicular to the rod and intersects the rod, wherein the actuator lever is pivotally mounted on the housing about an axis that is perpendicular to the axis of rotation of the spool.

2. A reel according to claim 1, wherein the actuator lever extends along the rod and is substantially parallel to the rod.

3. A reel according to claim 1, wherein the actuator lever is pivotally mounted to a wall of the housing.

4. A reel according to claim 1, wherein the actuator lever is connected by a cable to an arm pivotally mounted inside the housing about an axis parallel to the axis of rotation of the spool, said arm being connected to the housing by a return spring and having a toothed sector engaging with the spool by means of step-up gear means for amplifying motion produced by the actuator lever.

5. A reel according to claim 1, wherein the actuator lever includes an end that extends inside the housing substantially parallel to the axis of rotation of the spool.

6. A reel according to claim 5, further comprising a first pulley carried by said end of the actuator lever, a cable passing over the first pulley and having an end directly fixed to the housing and another end fixed to the housing by means of a spring, a toothed wheel connected to the spool for driving the spool into rotation, and step-up gear means driven by the cable and engaging with the toothed wheel for amplifying motion produced by the actuator lever.

7. A reel according to claim 6, wherein the step-up gear means comprises a second pulley over which the cable passes, said cable being further fixed to a point of the periphery of the second pulley for driving the second pulley into rotation.

8. A reel according to claim 1, further comprising a cylindrical shaft fixed to a wall of the housing, a rotary sleeve installed on the cylindrical shaft and carrying the spool, and resilient snap-fastening means provided on a free end of the shaft and the sleeve for holding axially the sleeve on the shaft, said resilient snap-fastening means comprising axial pusher means for releasing the sleeve from the shaft.

9. A reel according to claim 8, further comprising a first brake washer carried by the sleeve, a second brake washer carried by the spool and bearing resiliently with gentle friction against the first brake washer, and screw means provided on the sleeve and acting on the spool for adjusting the friction force between the first brake washer and the second brake washer.

* * * * *